(12) United States Patent
Suehiro

(10) Patent No.: US 8,776,823 B2
(45) Date of Patent: Jul. 15, 2014

(54) FUEL SHUT-OFF VALVES

(75) Inventor: Yujiro Suehiro, Nagoya (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 468 days.

(21) Appl. No.: 13/099,656

(22) Filed: May 3, 2011

(65) Prior Publication Data

US 2011/0278482 A1     Nov. 17, 2011

(30) Foreign Application Priority Data

May 11, 2010   (JP) ................................ 2010-109255

(51) Int. Cl.
*F16K 24/04*   (2006.01)

(52) U.S. Cl.
USPC .......................................................... 137/202

(58) Field of Classification Search
USPC ..................................... 137/43, 202; 141/198
See application file for complete search history.

(56) References Cited

U.S. PATENT DOCUMENTS

| 6,640,804 B2 * | 11/2003 | Ivri et al. ................ 128/200.16 |
| 6,826,833 B1 * | 12/2004 | Maier et al. ................ 29/888.44 |
| 7,686,030 B2 * | 3/2010 | Furuya et al. ................ 137/202 |
| 2007/0209659 A1 * | 9/2007 | Ivri et al. ................ 128/200.14 |
| 2011/0186149 A1 * | 8/2011 | Tagami et al. ................ 137/409 |
| 2012/0037834 A1 * | 2/2012 | Lang et al. ................ 251/368 |

FOREIGN PATENT DOCUMENTS

| JP | 2001-082270 A | 3/2001 |
| JP | 2001082270 | 3/2001 |
| JP | 2010-077941 | 4/2010 |

OTHER PUBLICATIONS

Japanese Office Action mailed Sep. 10, 2013, corresponding to Japanese Patent Application No. 2010-109255; with English language translation.
Japanese Final Office Action mailed Dec. 3, 2013, corresponding to Japanese Patent Application No. 2010-109255; with English language translation.

\* cited by examiner

*Primary Examiner* — Craig Schneider
(74) *Attorney, Agent, or Firm* — Ladas & Parry LLP

(57) ABSTRACT

A fuel shut-off valve includes a casing defining therein a valve chamber communicating between inside and outside of a fuel tank. A bottom wall member defines a bottom of the valve chamber and has communication holes formed therein, so that the valve chamber communicates with the inside of the fuel tank via the communication holes. A valve mechanism is disposed within the valve chamber and capable of preventing fuel from flowing from the valve chamber to the outside of the fuel tank depending of a fuel level within the fuel tank. A flow area of each of the communication holes decreases in an outflow direction of the fuel from the valve chamber to the inside of the fuel tank.

19 Claims, 4 Drawing Sheets

FUEL SHUT-OFF VALVES

This application claims priority to Japanese patent application serial number 2010-109255, the contents of which are incorporated herein by reference.

BACKGROUND OF THE INVENTION

1. Field of the Invention

The present invention relates to fuel shut-off valves used for shutting off flow of fuel.

2. Description of the Related Art

A fuel shut-off valve is known that is provided at an upper portion of a fuel tank, for example, of an automobile. The fuel shut-off valve prevents fuel from flowing out of the fuel tank, for example, when an automobile has been excessively inclined or rolled over. The fuel shut-off valve is also called a "fuel cut-off valve" or a "rollover valve."

In general, the fuel shut-off valve is closed to prevent fuel flow flowing out of the fuel tank in response to the upward movement of the float as the fuel level within the fuel tank rises. To this end, a known device, such as that disclosed in Japanese Laid-Open Patent Publication No. 2001-82270, has proposed to provide communication holes in a bottom wall of a casing defining a valve chamber that vertically movably receiving the float, so that the communication holes communicate between inside of the fuel tank and the valve chamber. Therefore, the fuel or gas within the fuel tank flows into the valve chamber via the communication hole and the fuel flowing into the valve chamber flows into the fuel tank.

The above structure of the known device is shown in FIGS. 8 and 9 that are a plan view showing the communication hole and a sectional view taken along line IX-IX in FIG. 8, respectively. As shown in FIGS. 8 and 9, each of communication holes 100 of the known device is configured as a circular straight hole extending vertically through a bottom wall 102 and having a fixed diameter d (see FIG. 9).

In the case of the known device, there is a problem that the fuel flowing into the valve chamber cannot be smoothly discharged into the fuel tank due to the straight configuration of the communication holes 100. Therefore, when the automobile turns around, the fuel may flow from the valve chamber to the outside (e.g., a vapor passage communicating with a canister) to cause a phenomenon known as "spillage".

Therefore, there is a need in the art for a shut-off valve that enable fuel flown into a valve chamber to be easily discharged into a fuel tank.

SUMMARY OF THE INVENTION

According to the present teaching, a fuel shut-off valve includes a casing defining therein a valve chamber communicating between inside and outside of a fuel tank. A bottom wall member defines a bottom of the valve chamber and has communication holes formed therein, so that the valve chamber communicates with the inside of the fuel tank via the communication holes. A valve mechanism is disposed within the valve chamber and capable of preventing fuel from flowing from the valve chamber to the outside of the fuel tank depending of a fuel level within the fuel tank. A flow area of each of the communication holes decreases in an outflow direction of the fuel from the valve chamber to the inside of the fuel tank.

DETAILED DESCRIPTION OF THE INVENTION

Figure 1:
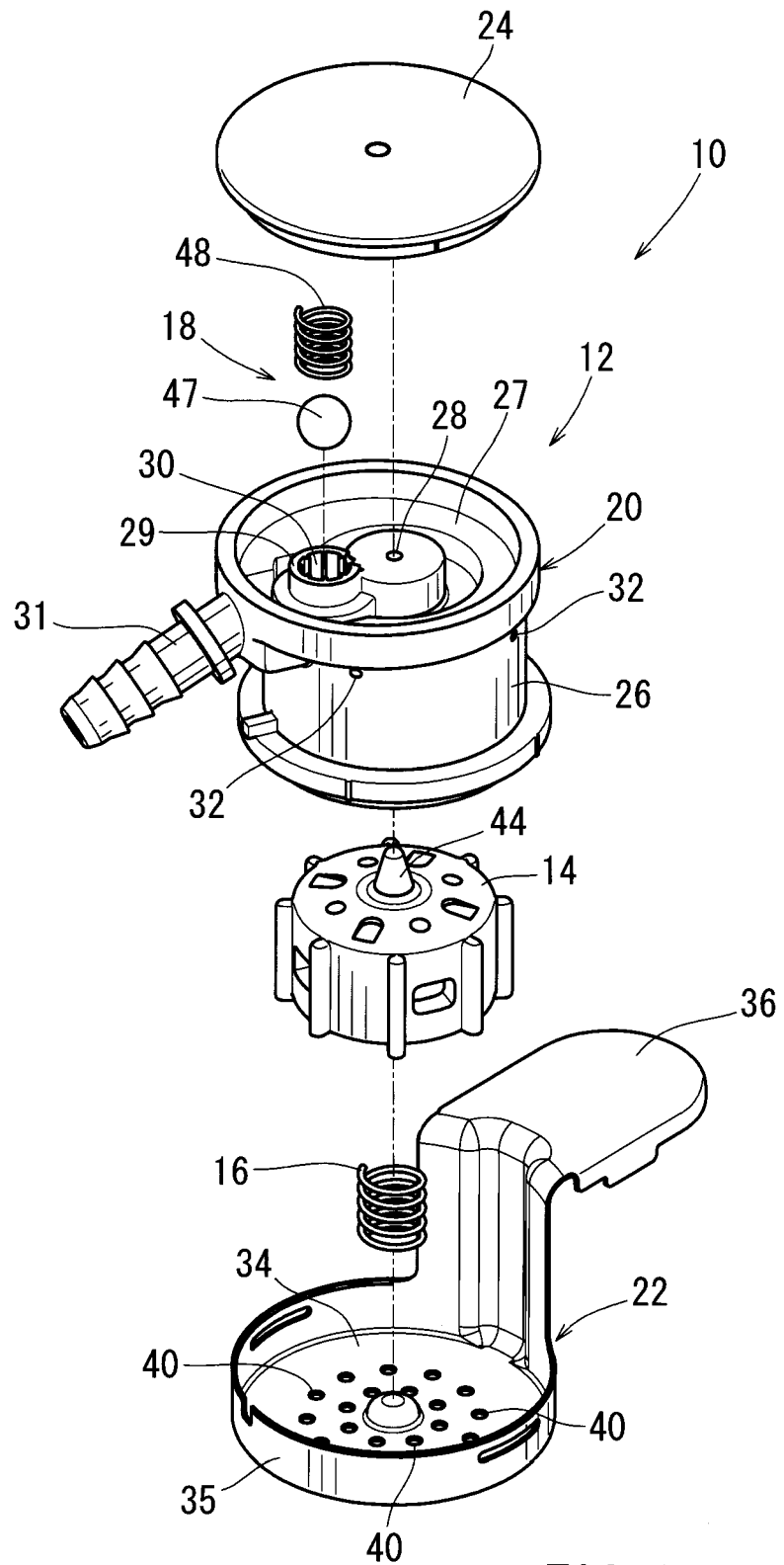
FIG. 1 is an exploded perspective view of a fuel shut-off valve according to a first example.

Each of the additional features and teachings disclosed above and below may be utilized separately or in conjunction with other features and teachings to provide improved fuel shut-off valves. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a fuel shut-off valve includes a casing defining therein a valve chamber communicating between inside and outside of a fuel tank. A bottom wall member defines a bottom of the valve chamber and has communication holes formed therein, so that the valve chamber communicates with the inside of the fuel tank via the communication holes. A float valve is disposed within the valve chamber and moves upward with rise of a fuel level of fuel within the fuel tank to prevent the fuel from flowing from the valve chamber to the outside of the fuel tank. Each of the communication holes is tapered to have a diameter decreasing in a direction from an upper surface side of the bottom wall member toward a lower surface side of the bottom wall.

With this arrangement, the flow velocity of fuel flowing through the communication holes increases in the direction of flow of the fuel through the communication holes. Therefore, the fuel flowing into the valve chamber can be rapidly discharged from the valve chamber. Hence, it is possible to reliably prevent occurrence of the spillage phenomenon.

The inner circumferential surface of each of the communication holes may have at least a portion extending along a convex curved line in cross section in a vertical direction. With this arrangement, it is possible to further increase the velocity of the fuel flowing through the communication holes.

The communication holes may be formed by punching the bottom wall, enabling the communication holes to be easily formed.

First Example

A first example will be now described with reference to FIGS. 1 to 4. Referring to FIG. 2, a fuel shut-off valve 10 generally includes a casing 12, a float 14, a valve spring 16 and a relief valve 18. As with a known shut-off valve, the fuel shut-off valve 10 may be mounted to an upper portion (e.g., a top wall) of a fuel tank T such that the lower half of the casing 12 is positioned within a gaseous-phase region G within the fuel tank T.

Figure 2:
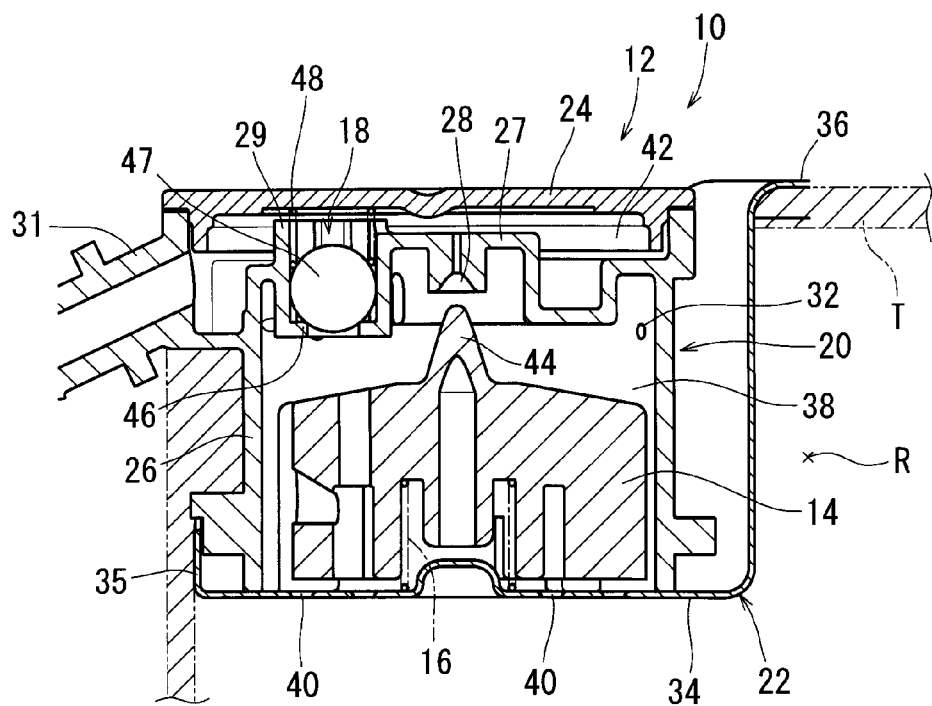
FIG. 2 is a vertical sectional view of the fuel shut-off valve.

The casing 12 has a casing body 20, a retainer 22 and a cover 24 (see FIG. 1). The casing body 20 includes a cylindrical tubular wall portion 26 and an upper wall portion 27 that is positioned within the upper part of the tubular wall portion 26 at a position slightly downward of the upper end of the tubular wall portion 26 to close the opening of the tubular wall portion 26. The central part of the upper wall portion 27 is formed with a valve hole 28 extending vertically through the central part. The left side part as viewed in FIG. 2 of the upper wall portion 27 is formed with a cylindrical tubular portion 29 extending in a vertical direction and defining a relief passage 30 extending vertically therethrough. A round pipe-like connecting pipe portion 31 is formed with the outer circumference of the upper wall portion 27 and extends outwardly (leftwardly as viewed in FIG. 2) therefrom. A plurality of gas passage holes 32 are formed in the upper part of the tubular wall portion 26 at a position adjacent to the lower side of the upper wall portion 27 and extend through the upper part in the diametrical direction. The gas passage holes 32 are spaced from each other by a given distance along the circumferential direction of the tubular wall portion 26. The casing body 20 is a one-piece member molded by resin.

The retainer 22 includes a disk-shaped bottom wall portion 34, a side wall portion 35 extending vertically upward from the outer circumferential edge of the bottom wall portion 34, and a handle-like portion 36 having a vertical part extending upwardly from the side wall portion 35 and a horizontal part extending radially outward from the upper end of the vertical part. The retainer 22 is a one-piece member formed by press-molding a metal sheet material. In this example, the bottom wall portion 34 serves as a bottom wall member defining a bottom of a valve chamber 38 that will be explained below.

The retainer 22 is attached to the tubular wall portion 26 of the casing body 20 such that it closes the lower opening of the tubular wall portion 26 (see FIG. 1). The valve chamber 38 is defined as a hollow cylindrical space between the casing body 20 and the retainer 22 (see FIG. 2). In addition, a plurality of communication holes 40 are dispersedly formed in the bottom wall portion 34 of the retainer 22 to extend therethrough in a direction of thickness of the bottom wall portion 34 or a vertical direction (see FIG. 1). The retainer 22 may be called a bottom wall portion forming member.

The cover 24 has a disk shape and is attached to the tubular wall portion 26 of the casing body 20 so as to close the upper opening of the tubular wall portion 26 (see FIG. 2). Therefore, a communication chamber 42 is defined between the casing body 20 and the cover 24. The communication chamber 42 communicates with the valve chamber 38 via the relief passage 30 and also communicates within the connecting pipe portion 31. The connecting pipe portion 31 can be connected to a canister (not shown) via a hose or like piping member. The cover 24 is a one-piece member molded by resin.

The float 14 is disposed within the valve chamber 38 so as to be able to move up and down within the valve chamber 38. A conical valve portion 44 is formed on a central portion of the float 14 so as to be opposed to a valve hole 28 formed in the casing body 20.

The valve spring 16 is a coil spring interposed between the retainer 22 and the float 14 and serves to enhance the buoyancy of the float 14.

The relief valve 18 is disposed within the relief passage 30. The relief valve 18 includes a valve seat 46, a valve body 47 and a relief spring 48. The valve seat 46 is formed at the lower end of the tubular portion 29 and extends radially inwardly therefrom like a flange. The valve body 47 is assembled within the relief passage 30 and has a spherical shape for seating on the valve seat 46. The relief spring 48 biases the valve body 47 downwardly toward the valve seat 46. The relief spring 48 is a coil spring interposed between the valve body 47 and the cover 24.

The operation of the fuel shut-off valve 10 will now be described. During a normal driving condition of the automobile, the fuel level within the fuel tank T is lower than the fuel shut-off valve 10, and therefore, the float 14 is positioned at the lowest position within the valve chamber 38 by the gravity force. In this state, the valve portion 44 of the float 14 is positioned downwardly away from the valve hole 28 of the casing body 20 to open the valve hole 28. Therefore, the fuel shut-off valve 10 is in an open state. In this state, fuel vapor that may be produced at the gaseous-phase region R within the fuel tank T flows to the outside (more specifically, the canister) via the gas passage holes 32, the space between the float 14 and the upper wall portion 27 within the valve chamber 38, the valve hole 28, the communication chamber 42 and the connecting pipe portion 31.

If the fuel within the fuel tank T flows into the lower portion of the valve chamber 38 via the communication holes 40 of the retainer 22 due to inclination or rollover of the automobile, the float 14 rises within the valve chamber 38 due to the buoyancy. Therefore, the valve portion 44 of the float 14 closes the valve hole 28. As a result, the fuel shut-off valve 10 is brought to a close state. Because the communication passage (the valve hole 28) between the valve chamber 38 and the communication chamber 42 is blocked in this state, the fuel within the fuel tank T is prevented from flowing to the outside (more specifically, the canister). If the automobile returns to the normal position, the fuel within the valve chamber 38 flows down into the fuel tank T via the communication holes 40 of the retainer 22, so that the fuel shut-off valve 10 is brought to the open state.

In addition, during the normal condition of the automobile, the relief valve 18 is held in the close state because the valve member 47 is seated on the valve seat 46 by the biasing force of the relief spring 48. If the pressure within the fuel tank T reaches a given value, the valve body 47 moves away from the valve seat 46 against the biasing force of the relief spring 48, so that the relief valve 18 is brought to the open state. Therefore, the relief passage 30 bypassing the valve hole 28 is brought to the communicating state, so that the pressure within the fuel tank T is released to the outside. As a result, it is possible to prevent the pressure within the fuel tank T from exceeding the given valve. If the pressure with the fuel tank T becomes lower than the given value, the relief valve 18 is again closed.

Figure 3:
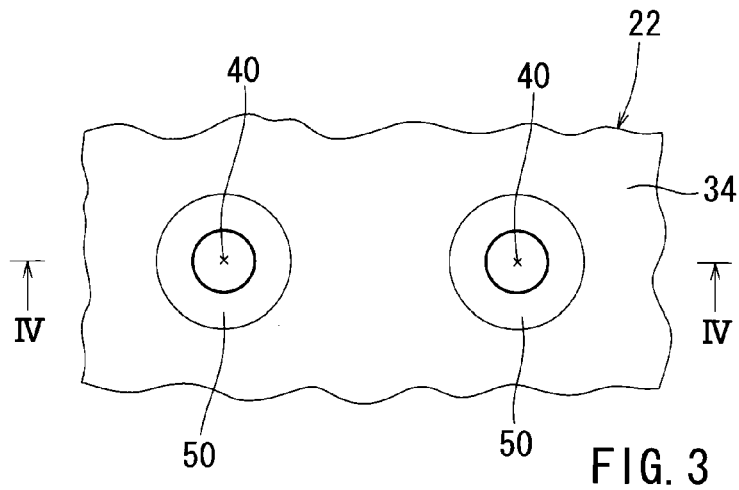
FIG. 3 is a plan view of a part of a bottom wall of a retainer of the fuel shut-off valve.
Figure 4:
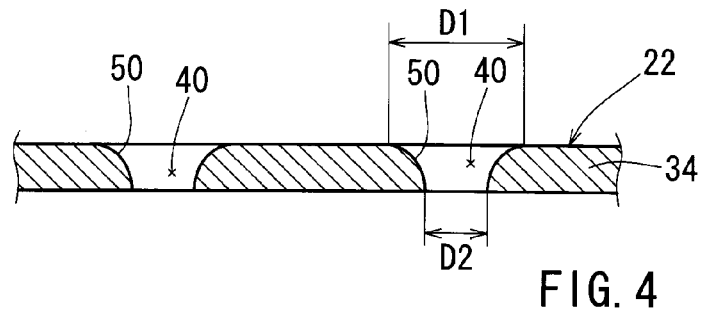
FIG. 4 is a sectional view taken along line IV-IV I FIG. 3.

The communication holes 40 of the retainer 22 will now be described in detail with reference to FIGS. 3 and 4. Because the communication holes 40 have the same configuration, the configuration of only one communication hole 40 will be hereinafter explained. As shown in FIGS. 3 and 4, the communication hole 40 of the retainer 22 is configured such that a flow area of the communication hole 40 decreases in an outflow direction from the upper side of the bottom wall 34 toward its lower side. In this example, the circumferential surface of the communication hole 40 is configured as a tapered circular hole having a diameter gradually decreasing in a direction from the upper side of the bottom wall 34 toward its lower side. More specifically, the inner circumferential surface of the communication hole 40 is inclined along a convex arc-shaped curved line 50 in vertical cross section.

Figure 8:
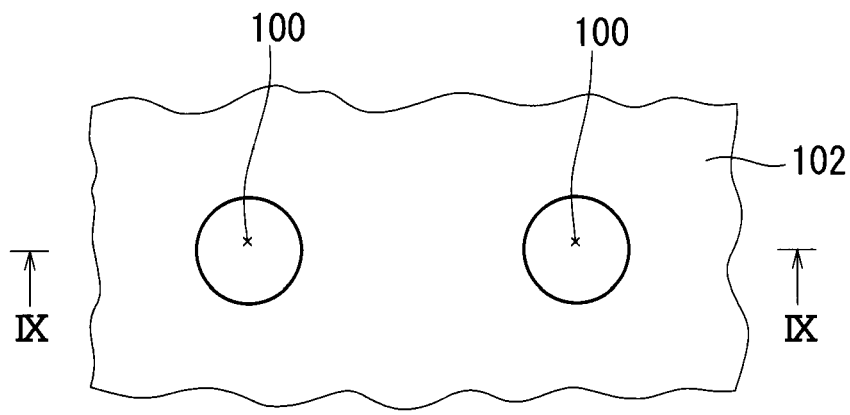
FIG. 8 is a plan view of a bottom wall of a casing of a known fuel shut-off valve.
Figure 9:
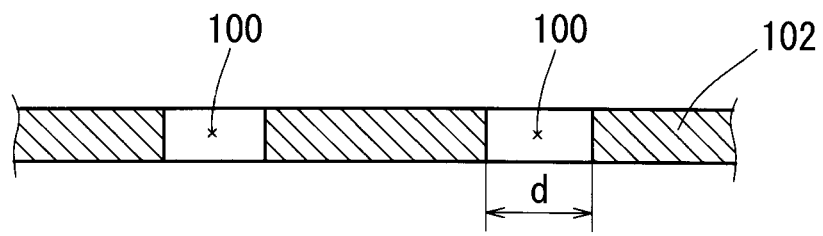
FIG. 9 is a sectional view taken along line IX-IX in FIG. 8.

As shown in FIG. 4, a maximum diameter D1 at the upper end of the communication hole 40 and a minimum diameter D2 at the lower end of the same are set to satisfy the following relationship with the diameter d of the communication hole 100 of the known device shown in FIGS. 8 and 9:

D1>d; and

D2<d

The communication holes 40 are formed by punching the bottom wall portion 34 of the retainer 22. Preferably, the punching operation may be performed simultaneously with the press-molding operation of the retainer 22. However, the punching operation may be performed separately from the press-molding operation.

According to the fuel shut-off valve 10 described above, each of the communication holes 40 is configured as a tapered hole having a diameter gradually in a direction from the upper side of the bottom wall 34 toward its lower side. Therefore, the velocity of the fuel increase as the fuel flows downwardly through the communication holes 40. Hence, the fuel flowing into the valve chamber 38 of the casing 12 flows to be discharged rapidly through the communication holes 40. As a result, it is possible to inhibit or minimize the spillage phenomenon.

Further, because the minimum diameter D2 of the communication holes 40 is smaller than the diameter d of the communication holes 100 of the known device (see FIGS. 8 and 9), the fuel flowing into the valve chamber 38 of the casing 12 can be smoothly discharged into the fuel tank T, while the fuel within the fuel tank T is difficult to flow into the valve chamber 38 of the casing 12.

Further, because each of the inner circumferential surfaces of the communication holes 40 is inclined along the convex arc-shaped curved line 50 in vertical cross section, it is possible to incrementally increase the flow velocity of the fuel flowing downward through the communication holes 40.

Further, because the communication holes 40 are formed by punching the bottom wall portion 34 of the retainer 22, it is possible to easily form the communication holes 40 in the bottom wall 34.

Figure 6:
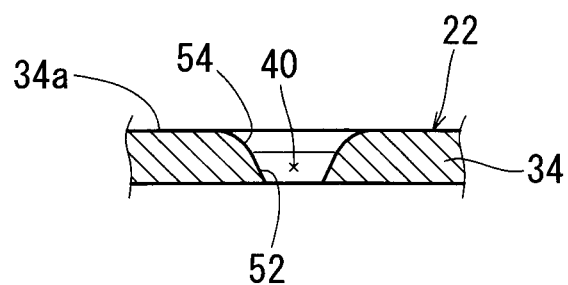
FIG. 6 is a vertical sectional view a part of a bottom wall of a retainer according to a third example.
Figure 7:
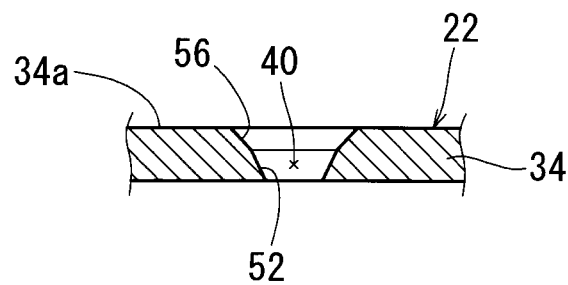
FIG. 7 is a vertical sectional view of a part of a bottom wall of a retainer according to a fourth example.

Second to fourth examples will now be described with reference to FIGS. 5 to 7. The second to fourth examples are modifications of the communication holes 40 of the bottom wall 34 of the retainer 22 of the first example. In other respect, the second to fourth, examples are the same as the first example. Therefore, in FIGS. 5 to 7, only one communication hole 40 of the retainer 22 is shown and the other parts of the fuel shut-off valve 10 are not shown. In addition, in FIGS. 5 to 7, like members are given the same reference signs as the first example and the description of these members will now be repeated.

Second Example

Figure 5:
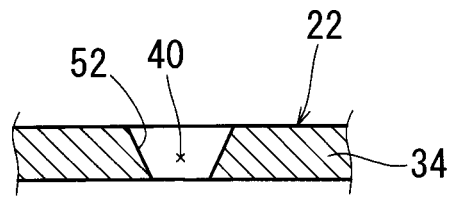
FIG. 5 is a vertical sectional view of a part of a bottom wall of a retainer according to a second example.

Referring to FIG. 5, according to the second example, the inner circumferential surface of the communication hole 40 is inclined along a straight line 52 in vertical cross section.

Third Example

The third example is a modification of the second example. According to the third example shown in FIG. 6, an upper portion of the straight line 52 of the inner circumferential surface of the communication hole 40 at a corner intersecting with an upper surface 34a of the bottom wall 34 of the retainer 22 is inclined along a convex arc-shaped curved line 54. In other words, the corner is chamfered with a surface extending along the curved line 54 in cross section.

Fourth Example

The fourth example is also a modification of the second example. According to the fourth example shown in FIG. 7, an upper portion of the straight line 52 of the inner circumferential surface of the communication hole 40 at a corner intersecting with an upper surface 34a of the bottom wall 34 of the retainer 22 is inclined along a straight line 56 that is inclined relative to the straight line 52 by a given angle. In other words, the corner is chamfered with a surface extending along the straight line 56 in cross section.

OTHER POSSIBLE MODIFICATIONS

The above examples may be modified in various ways. For example, although the retainer 22 is made of metal in the above examples, the retainer 22 may be made of resin. In addition, although the communication holes 40 are formed in the bottom wall 34 of the retainer 22, the communication holes 40 may be formed in any other member than the bottom wall 34 of the retainer 22 as long as it defines the bottom of the valve chamber. For example, the retainer 22 may be omitted and the casing body 20 of the casing 12 may have a bottom wall formed with the communication holes 40.

What is claimed is:

1. A fuel shut-off valve comprising:
   a casing defining therein a valve chamber communicating between an inside and an outside of a fuel tank;
   a bottom wall member defining a bottom of the valve chamber and having communication holes formed therein, so that the valve chamber communicates with the inside of the fuel tank via the communication holes;
   wherein each of the communication holes is tapered to have a diameter decreasing in a direction from an upper surface side of the bottom wall member toward a lower surface side of the bottom wall; and
   a float valve disposed within the valve chamber and moving upward with rise of a fuel level of fuel within the fuel tank to prevent the fuel from flowing from the valve chamber to the outside of the fuel tank.

2. The fuel shut-off valve as in claim 1, wherein an inner circumferential surface of each of the communication holes extends along a straight line in cross section in the vertical direction.

3. The fuel shut-off valve as in claim 1, wherein the communication holes are formed by punching the bottom wall.

4. The fuel shut-off valve as in claim 1, further comprising a retainer configured to retain the casing, wherein the retainer includes the bottom wall member.

5. The fuel shut-off valve as in claim 1, wherein the communication holes are dispersedly formed in the bottom wall member to extend therethrough in a thickness direction of the bottom wall member, the thickness direction being a vertical direction.

6. The fuel shut-off valve as in claim 1, wherein an inner circumferential surface of each of the communication holes has at least a portion extending along a convex curved line in cross section in a vertical direction.

7. The fuel shut-off valve as in claim 6, wherein the entire inner circumferential surface extends along the convex curved line in cross section in the vertical direction.

8. The fuel shut-off valve as in claim 6, wherein the inner circumferential surface has a first portion extending along the convex curved line in cross section in the vertical direction and a second portion extending along a straight line in cross section in the vertical direction.

9. The fuel shut-off valve as in claim 8, wherein the first portion and the second portion are disposed on the upper surface side and the lower surface side of the bottom wall, respectively.

10. A fuel shut-off valve comprising:
a casing defining therein a valve chamber communicating between an inside and an outside of a fuel tank;
a bottom wall member defining a bottom of the valve chamber and having communication holes formed therein, so that the valve chamber communicates with the inside of the fuel tank via the communication holes;
wherein a flow area of each of the communication holes decreases in an outflow direction of the fuel from the valve chamber to the inside of the fuel tank; and
a valve mechanism disposed within the valve chamber and capable of preventing fuel from flowing from the valve chamber to the outside of the fuel tank depending on a fuel level within the fuel tank.

11. The fuel shut-off valve as in claim 10, wherein the communication holes are formed by punching the bottom wall member.

12. The fuel shut-off valve as in claim 10, further comprising a retainer configured to retain the casing, and wherein the retainer includes the bottom wall member.

13. The fuel shut-off valve as in claim 10, wherein the communication holes are dispersedly formed in the bottom wall member to extend therethrough in a thickness direction of the bottom wall member, the thickness direction being a vertical direction.

14. The fuel shut-off valve as in claim 10, wherein each of the communication holes is tapered to have a diameter decreasing in the outflow direction.

15. The fuel shut-off valve as in claim 14, wherein an inner circumferential surface of each of the communication holes extends along a straight line in cross section in the outflow direction.

16. The fuel shut-off valve as in claim 14, wherein an inner circumferential surface of each of the communication holes has at least a portion extending along a convex curved line in cross section in the outflow direction.

17. The fuel shut-off valve as in claim 16, wherein the entire inner circumferential surface extends along the convex curved line in cross section in the outflow direction.

18. The fuel shut-off valve as in claim 16, wherein the inner circumferential surface has a first portion extending along the convex curved line in cross section in the outflow direction and a second portion extending along a straight line in cross section in the outflow direction.

19. The fuel shut-off valve as in claim 18, wherein the first portion and the second portion are disposed on an upper surface side and a lower surface side of the bottom wall, respectively.

* * * * *